(12) United States Patent
Chang et al.

(10) Patent No.: US 8,492,722 B2
(45) Date of Patent: Jul. 23, 2013

(54) VOLATILE ORGANIC COMPOUND SENSOR

(75) Inventors: Seongsik Chang, Santa Clara, CA (US); Krzysztof Nauka, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 272 days.

(21) Appl. No.: 13/095,126

(22) Filed: Apr. 27, 2011

(65) Prior Publication Data
US 2012/0273682 A1 Nov. 1, 2012

(51) Int. Cl.
*G01J 5/58* (2006.01)
(52) U.S. Cl.
USPC ..................... 250/339.12; 250/343
(58) Field of Classification Search
USPC .................. 250/338.1, 339.12, 343
See application file for complete search history.

(56) References Cited

U.S. PATENT DOCUMENTS
2008/0220535 A1* 9/2008 LeBoeuf et al. .............. 436/164
2011/0056274 A1 3/2011 Bunod et al.

OTHER PUBLICATIONS

"Sensor Suite Sensors", Aircuity Inc., OptiNet, 2008 and 2009, 11 pages, www.aircuity.com.

\* cited by examiner

*Primary Examiner* — Mark R Gaworecki (57) ABSTRACT

A volatile organic compound sensor includes a source of infrared (IR) light, a detector for detecting the IR light, and a space defined between the IR light source and the IR light detector. The space includes volatile organic compounds (VOCs). The IR light detector measures an amount of IR light transmitted through the space, the measured IR light transmitted being attenuated by VOC light absorption when in the space. An amount of the IR light attenuation is related to a concentration of the VOCs present in the space.

15 Claims, 5 Drawing Sheets

VOLATILE ORGANIC COMPOUND SENSOR

BACKGROUND

The present disclosure relates generally to volatile organic compound sensors.

Some printing systems are configured to employ inks that include components capable of emitting volatile organic compound(s) (VOCs). The VOCs may, in some instances, be emitted from the printing inks and become part of one or more air or gas streams inside the printing system. In some cases, the printing system can sustain the presence of the VOCs as long as their concentration is such that the VOCs do not deleteriously affect at least the internal operation(s) of the printing system. Furthermore, the VOCs emitted by the printing system may propagate outside of the printer housing, and into the surrounding atmosphere.

BRIEF DESCRIPTION OF THE DRAWINGS

Features and advantages of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Example(s) of the VOC sensor as disclosed herein may be incorporated into a printing system, for example, a digital printing system (such as a liquid electrophotographic (LEP) printing system) or a solvent-based inkjet printing system, to monitor the presence of VOCs inside or outside the printing system over a broad VOC concentration range. In an example, the VOC sensor (whether located inside or outside of the printing system) is capable of monitoring VOCs having a concentration ranging from about 0.5 ppm to about 10,000 ppm. In another example (e.g., where the sensor is used inside the printing system), the VOC sensor is capable of monitoring VOCs inside the printing system having a concentration ranging from about 10 ppm to about 10,000 ppm. In yet another example (e.g., where the sensor is used outside of the printing system), the VOC sensor is capable of monitoring VOCs outside of the printing system (e.g., the VOCs emitted by the printing system during printing) having a concentration ranging from about 1 ppm to about 5,000 ppm. In still another example, the sensor is capable of monitoring VOCs outside the printing system having a concentration ranging from about 0.5 ppm to about 180 ppm. It is believed that the monitoring enables one to easily detect the concentration level of VOCs present inside and/or outside the printing system, for example, to prevent instances where the VOC concentration exceeds concentration levels that may undesirably and/or deleteriously affect at least the operability of the printing system. Further, it is believed the monitoring enables one to control the VOC level in the area surrounding the printing system to be within desirable levels.

It is further believed that the VOC sensor may be used to obtain an accurate, then-current concentration level of the VOCs inside and/or outside the printing system relatively quickly (e.g., within a couple of milliseconds). Additionally, the VOC sensor is compact, and has a relatively simple design so that the sensor can be easily installed (e.g., inside and/or outside of the printing system), maintained, replaced, and/or repaired if necessary.

As used herein, a "volatile organic compound" or "VOC" is a natural or synthetic organic compound that, when emitted into the atmosphere, may adversely affect the environment and/or, in some cases, human health. VOCs may be emitted from a number of various systems, examples of which include home and/or office furnishings, office equipment (such as, e.g., photocopiers and printers), motorized vehicles (e.g., automobiles, motorcycles, planes, boats, etc.), motorized equipment (e.g., lawnmowers, snow blowers, etc.), and/or the like. Further, the VOCs may be emitted in the form of a gas, or as liquid particulates having a dimension (e.g., in terms of an effective diameter of each particle) below 1 μm that can remain suspended in the air. Further, there are a number of different VOCs that may be monitored based, at least in part, on the system emitting the VOCs. For example, ISOPAR® L (a clear isoparaffin fluid, typically containing less than 1 ppm benzene and less than 1 ppm sulfur, available from Exxon-Mobil Co., Irving, Tex.) is a hydrocarbon that may be used as a solvent for a printing ink, and this solvent may vaporize during printing and remain as a VOC inside the printer, or be emitted from the printer to the printer's surrounding environment (i.e., outside of the printer). In another example, certain lubricants (such as those that may be used for lubricating moving machinery, such as, e.g., CRYTOX® brand lubricant (E.I. du Pont de Nemours and Company, Wilmington, Del.), ARCANOL™ brand lubricant (FAG Industrial Services, GmBH, Herzogenrath, Germany), and/or the like) used in some printing systems may also be capable of emitting gaseous VOCs during printing processes.

Without being bound to any theory, it is believed that the concentration of VOCs present in a system (such as in a printing system) is related to, and thus may be determined from an amount of the selected IR light frequencies attenuated by VOC light absorption when the IR light is traveling through a space defined inside the system containing the VOCs. The amount of IR light attenuated by VOC light absorption may be determined by measuring an amount of IR light transmitted through the space containing the VOCs, and then comparing it to the amount of the IR light transmitted through the same space when the VOCs are absent.

Figure 1A:
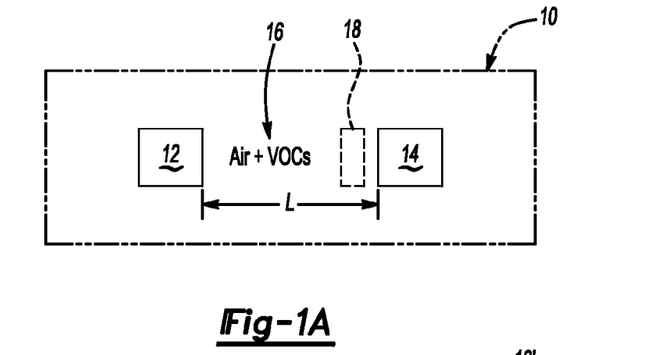
FIGS. 1A and 1B schematically depict examples of a volatile organic compound (VOC) sensor, where one example includes an open infrared (IR) light detection space (FIG. 1A), and the other example includes an enclosed IR light detection space including at least an entrance way for air to enter the space (FIG. 1B)
Figure 1B:
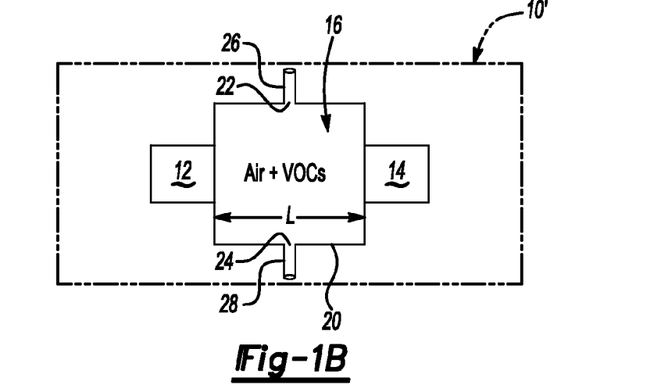

In an example, the amount of IR light transmitted through the space inside the printing system containing the VOCs may be determined using an optical setup incorporated into the printing system. The optical setup is referred to herein as a VOC sensor 10, 10', and is schematically depicted in FIGS. 1A and 1B, respectively. It is to be understood that the VOC sensor 10, 10' will be described in detail below for use in a digital printer that uses inks based on light, aliphatic hydrocarbon solvents (such as, e.g., a liquid electrophotographic (LEP) printer that uses inks including, e.g., ISOPAR® L solvent). It is believed, however, that the teachings of the VOC sensor of the instant disclosure may apply to, or otherwise be incorporated into other systems. For instance, the VOC sensor 10 may be scaled to fit inside a larger system (such as large offset printing presses (e.g., those commercially available from Heidelberger Druckmaschinen AG), or in other systems such as an automobile) or inside a smaller system (such as in a small, form-factor inkjet printer that uses non-aqueous inks).

Referring now to FIGS. 1A and 1B, the VOC sensor 10, 10' generally includes a source of IR light (i.e., an IR light source 12), a detector for measuring an IR light intensity (i.e., an IR light detector 14), and a space 16 defined between the IR light source 12 and the IR light detector 14. The space 16 includes a stream of ambient gas(es) originating from inside a printer (such as an electrophotographic printer 100 shown in FIG. 3), and this stream contains primarily air and molecules of one or more VOCs, such as ISOPAR® L mentioned above. In the example shown in FIG. 1A, the space 16 defined in the sensor 10 is open and surrounded by an ambient environment at the location where it 10 is mounted. The open configuration of the space 16 enables the sensor 10 to be mounted at selected location(s) inside the printing system 100 so that the sensor 10 can accurately monitor the presence of the VOCs at these location(s) inside the printing system 100. In other words, the open configuration allows air containing the VOCs to flow unimpeded into the open space 16. Further, in this configuration, the IR light source 12 and the IR light detector 14 are disposed at a predefined distance from each other at the desired predefined location inside the printer 100.

In the example shown in FIG. 1B, the space 16 of the VOC sensor 10' (which is defined between the IR light source 12 and the IR light detector 14) is enclosed, e.g., by enclosing the space 16 alone with an enclosure (identified by reference numeral 20) having a line-of-sight defined between the IR light source 12 and the IR light detector 14. This line-of-sight is clear. In another example, the entire sensor 10' is enclosed within the enclosure 20 (not shown in the figures). The enclosure 20 is ambient-tight to hold the ambient air containing VOCs inside the enclosure 20 and to prevent an outside ambient from penetrating into the enclosure 20. The enclosure 20 may also be used, e.g., to prevent spurious IR radiation originating from IR sources (e.g., inside or outside of the printing system depending on where the sensor 10' is positioned) other than the IR light source 12 from reaching the IR detector 14.

The enclosure 20 may be made of any material that is non-reactive with the VOCs, some examples of which include plastics, glass, metals, and/or the like. Further, the enclosure 20 includes inflow 22 and outflow 24 openings that provide substantially unimpeded flow of ambient air (which contains VOCs) into and out of the enclosure 20 where VOC monitoring is to take place. Although the inflow opening 22 is shown in FIG. 1B as situated at the top of the enclosure 20, and the outflow opening 24 is shown situated at the bottom of the enclosure, the inflow 22 and outflow 24 openings may be placed in any position so long as air can flow unimpeded into and out of the enclosure 20. In an example, the openings 22, 24 may be equipped with ducting 26, 28, respectively (such as, e.g., flexible tubing or the like), which collects the ambient air from the environment desired to be monitored surrounding the sensor 10', and directs an unimpeded flow of the air into and out of the enclosure 20. In another example, the openings 22, 24 may be equipped with remotely controlled valves and a clean-air purge line to facilitate a reference point measurement of VOCs (i.e., ambient air that does not include VOCs). The sensor 10' may be placed a distance from the location(s) where monitoring is desired, and still provide an accurate VOC concentration determination.

In an example, the length of the space 16 (whether the space 16 is open (as shown in FIG. 1A) or enclosed (as shown in FIG. 1B)) defines an optical path length over which IR light passes from the IR light source 12 to the IR detector 14 through the space 16 containing the VOCs. For use in a printing system (such as a digital inkjet printer), the length L of the space 16 may range from about 0.5 cm to about 100 cm. In another example, the length L ranges from about 4 cm to about 20 cm. In still another example, the length L ranges from about 1 cm to about 8 cm. As previously mentioned, the length L of the space 16 may be larger or smaller depending, at least in part, on the type of system in which the VOC sensor 10 is used, the source 12 and detector 14 parameters (e.g., the sensitivity of the detector 14 and the IR source 12 emitted power), the application of passive elements that enhance IR light collection (e.g., a large area mirror focusing light onto the detector 14), and expected VOC concentrations. For instance, the length L may be as large as 1 meter, for example, when incorporated into larger systems, or may be as small as 1 mm when incorporated into smaller systems. Further, a longer length L is needed for low concentration detection than for high concentration detection. According to Beer's Law, the minimum length L needed to detect the absorption coefficient α is:

$$L = \frac{1}{\alpha_c}\left(\frac{NEP}{I_0}\right) \quad \text{(Eqn. 1)}$$

where $I_0$ is the input optical power (W), $\alpha_c$ is the absorption coefficient at a given concentration c, and NEP is the noise equivalent power. For instance, for a chosen IR source 12/IR detector 14 pair having an $I_0$/NEP of about $1\times10^4$, a detection of 1 ppm of VOCs (i.e., α equal to $\frac{1}{20,000}$ cm$^{-1}$) needs an optical path length L of about 2 cm. Applying the same principles above, an optical path length L of about 0.2 cm is needed for detection of about 10 ppm for the same IR source 12/IR detector 14 pair.

It is to be understood that the length L of the space 16 may also be adjustable so that optimal operating conditions may be obtained for a wide range of VOC concentrations. For instance, the IR source 12 and the IR detector 14 may be mounted on a common rail so that the source 12 or the detector 14 may be moved to adjust the length L of the space 16 as desired. Additionally, the length L of the space 16 may be predetermined based, at least in part, on the highest expected concentration of the VOCs to be monitored, and on a desired sensitivity of the VOC monitoring process utilizing the VOC sensor 10, 10'.

The IR light source 12 may be chosen from any source of IR light that may suitably be incorporated in, or adjacent to the system for which the VOC sensor 10, 10' will be used. For use in a printing system (such as the printer 100), the IR light source 12 may also be chosen from one that is affordable (e.g., in terms of cost) and performs up to a desired standard (e.g., in terms of emitted power (W)). In one example, the IR light source 12 may be chosen from a monochromatic IR light source, which is configured to emit light within a narrow band frequency range contained within the IR light absorption band of one or more particular VOCs. Examples of monochromatic IR light sources include IR light-emitting diode (LED) light sources (which are capable of emitting up to 30 mW of power) and Q-cascade laser IR light sources (which are capable of emitting up to 10 mW of power).

The IR light source 12 may also be chosen from a broadband blackbody IR light source, which may be less expensive than monochromatic light sources and is capable of producing a broad frequency band emission with power as determined by the power applied to the source 12. Some examples of broadband blackbody IR light sources include hot-filament broadband blackbody IR light sources (which are capable of emitting up to 5 W of power at an IR source 12 temperature of about 800° C.), diamond-like carbon broadband blackbody IR sources (which are capable of emitting up to 1 W of power at an IR source 12 temperature of about 800° C.), and photonic crystal broadband blackbody IR sources (which are capable of emitting up to 100 mW of power at an IR source 12 temperature of about 800° C.). It is to be understood that the IR light sources identified above may operate at different temperatures, where lower operating temperature renders lower emitted power, and higher operating temperature renders higher emitted power. For instance, the diamond-like carbon blackbody source may emit more power when operated at 900° C. than when operated at 600° C. However, higher operating temperatures may also shorten the lifetime of the IR light source. As such, it may be desirable in some instances to operate diamond-like sources at or below about 750° C., or photonic crystal sources at or below about 700° C.

Figure 2:
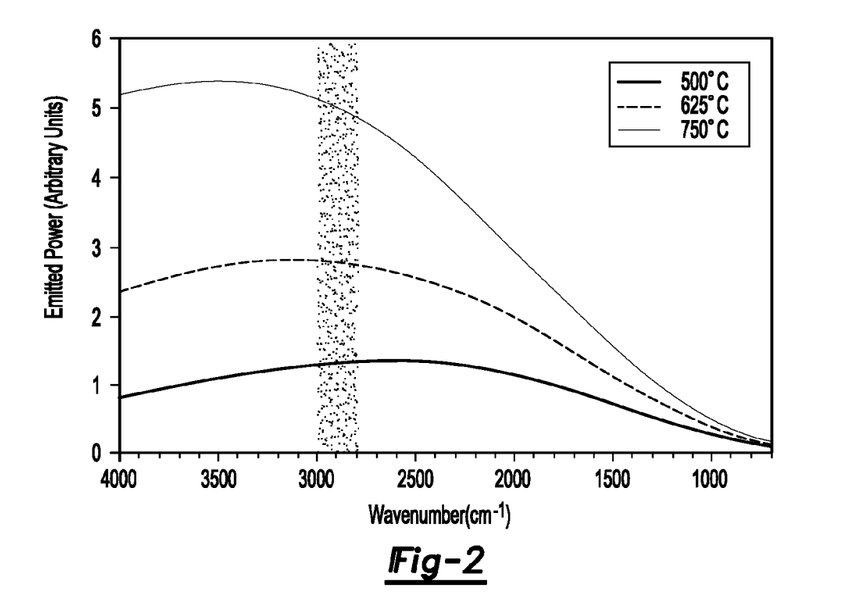
FIG. 2 is a graph of emission spectra of an example of a broadband blackbody IR light source operating at various temperatures with a superimposed transmission spectrum of a selected optical bandpass filter.

In an example, a narrow band transmission filter 18 (shown in dotted lines in FIG. 1A) may be incorporated into the VOC sensor 10, 10' so that the desired portion of the IR spectrum is able to reach the IR detector 14, with portions other than the desired portion not able to reach detector 14. It is believed that this is necessary for broadband blackbody IR light sources, where the filter 18 enables the transmission of the IR frequency band(s) corresponding to an IR absorption representative of the particular VOC(s) present in the space 16 defined in the VOC sensor 10, 10'. In other words, the filter 18 enables the portion of the broadband blackbody IR light source 12 emission corresponding to the VOCs absorption band alone to reach the detector 14. For instance, FIG. 2 sets forth a blackbody emission spectrum at different IR source temperatures, where a narrow band filter transmission is shown in the speckled portion of the spectrum. In this case, the filter has a bandwidth of about 200 nm, and was used to restrict the light emission of the broadband blackbody IR light source at a wavenumber ranging from 2800 cm$^{-1}$ to about 3000 cm$^{-1}$. FIG. 2 also shows that the IR emission spectrum changes with the source temperature, where the overall emission increases as temperature increases. When this occurs, the center of the IR emission spectrum shifts towards shorter wavelengths and/or higher frequencies. The source temperature may be adjusted to obtain desired IR emission power reaching the detector 14.

The filter 18 (such as, e.g., a narrow band transmission filter) may, for example, be placed adjacent to the broadband blackbody IR light source 12 (not shown in the figures) or adjacent to the IR detector 14 (shown in FIG. 1A). The filter 18 may also be placed in any suitable position along the line formed between the IR light source 12 and the IR detector 14.

In another example, the filter 18 may otherwise be placed or otherwise fabricated directly on the IR detector 14 surface, and thus the IR detector 14 and the filter 18 together form a single piece. For any of the configurations mentioned above, the filter 18 may be, for example, an interference filter including multiple layers of thin films having different indices of refraction. In other words, each layer of the filter is made of a specific material having a specific thickness that would facilitate transmission within the desired wavelength range alone.

In another example, the sensor 10, 10' may include a broadband IR light source 12 without a narrow band transmission filter. In this example, the length L of the space 16 may be adjusted periodically (e.g., by oscillatory movement of the IR light source 12 or the IR detector 14). The resultant broadband digital signal may be processed (e.g., via Fourier transformation converting the signal from the time domain into the frequency domain) in order to obtain information regarding the IR signal attenuation within a narrow region of the VOC absorption band.

The IR detector 14 may be chosen from any detector of IR light that is sensitive (i.e., the detector can respond/produce an electrical signal when illuminated with a light from the spectral region) within the spectral region where VOC absorption occurs, and may suitably be incorporated into the system and/or process for which the VOC sensor 10, 10' will be used. In an example, the detector 14 is chosen from one having a broadband spectral response ranging from about 2 μm to about 10 μm, and a specific detectivity D* (expressed in cm Hz$^{1/2}$/W units) ranging from 1×10$^8$ to 1×10$^9$ at an IR wavelength ranging from about 2 μm to about 10 μm. The specific detectivity D* is defined by the following equation (1):

$$D^* = \frac{\sqrt{A \times \Delta f}}{NEP} \quad \text{(Eqn. 1)}$$

where A is the detection area (e.g., cm$^2$), NEP is the noise equivalent power (e.g., W), and Δf is the effective noise bandwidth (e.g., Hz). Examples of detectors 14 that may be used include a thermopile detector (which has a D* of about 14×10$^8$), a PZT pyroelectric detector (which has a D* of about 4×10$^8$), a LiTaO$_2$ pyroelectric detector (which has a D* of about 8×10$^8$), a modified triglycine sulfate (TGS) pyroelectric detector (which has a D* of about 1×10$^9$), and a PbS photoconductive detector (which also has a D* of about 1×10$^9$).

It is to be understood that pyroelectric or photoconductive detector detection sensitivity may be further enhanced by modulating the emitted IR signal strength at frequencies ranging from about 1 Hz to about 1 kHz with the use of appropriate AC signal amplifier electronics. The modulation may be accomplished by varying the power applied to the IR light source 12, varying the length L of the space 16, or using a mechanical or electro-optical light chopper.

Figure 3:
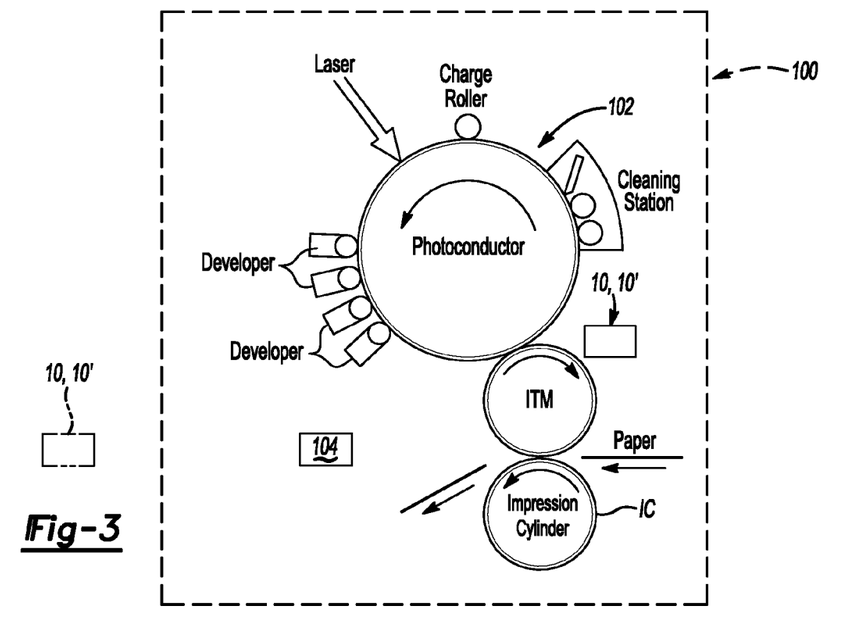
FIG. 3 schematically depicts an example of a printing system including the examples of the VOC sensor depicted in FIGS. 1A and 1B.
Figure 4:
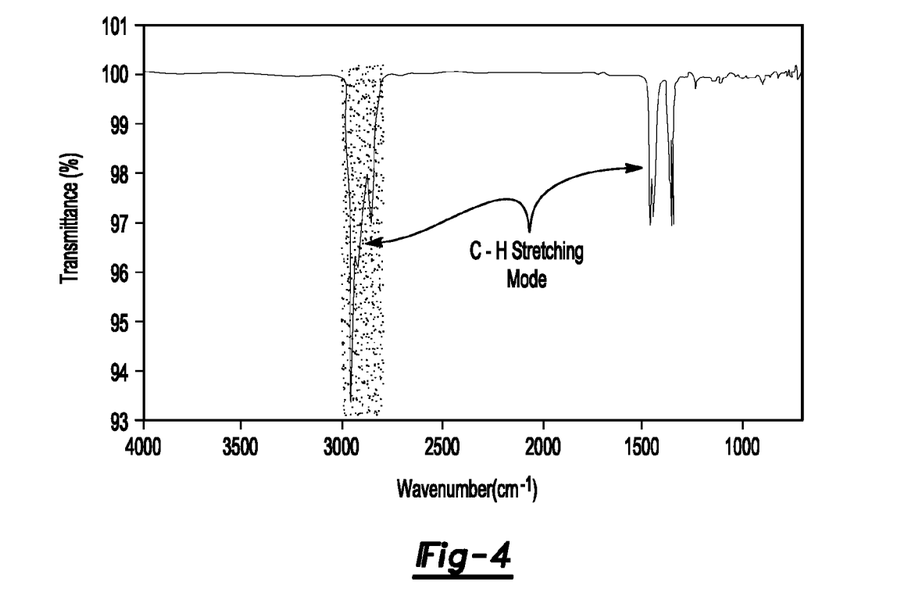
FIG. 4 is a graph depicting an example of a transmittance spectrum of liquid ISOPAR® L solvent with a superimposed transmission spectrum of a selected optical bandpass filter.

As previously mentioned, the VOC sensor 10, 10' may be incorporated into a printing system, such as the printing system 100 schematically depicted in FIG. 3. This printing system 100 includes a printer 102 and the VOC sensor 10, 10' operatively disposed inside, or otherwise incorporated into the printer 102 (where the sensor 10, 10' is represented as a labeled box drawn as a solid line in FIG. 3). The printer 102 may be chosen from any printer that may be used to print inks that include solvents capable of producing one or more VOCs. In this example, the VOC sensor 10, 10' is connected to a processor 104 (via, e.g., a wire or bus) operatively disposed in the printing system 100 so that signals from the IR detector 14 may be sent to and processed by the processor 104 to determine the concentration of VOCs present. In the example shown in FIG. 3, the printer system 100 includes a photoconductor, an intermediate transfer medium (ITM), an impression cylinder (IC), a charge roller, and a cleaning station.

In another example, the VOC sensor 10, 10' is operatively disposed outside of the printer 102, and thus outside of the printing system 100 (where the sensor 10, 10' is represented as a labeled box drawn in phantom in FIG. 3). In an example, the sensor 10, 10' is placed at a site outside of the printing system 100 where VOCs are likely to escape from the printing system 100 (such as, e.g., adjacent to the paper feeder, or opening of chambers containing the ink reservoirs). It is also contemplated as being within the purview of the present disclosure to use the VOC sensor 10, 10' as a standalone device that is placed at a desired area within a location (e.g., within a room of a building) where one or more printing systems are located. For example, the sensor 10, 10' may be independent from the printing system 100 and be placed on the floor, on a table, or other surface within the room within which the printing system 100 is located; or sensor 10, 10' may be physically attached to the printer housing.

Generally, the sensor 10, 10' may be placed in any location near the printing system 100 where a measurement of the VOC concentration is desirable. In some instances, the sensor 10, 10' may be situated so that power feeds may be obtained directly from the printer 102; or sensor 10, 10' may include its own power supply. Further, if desired, the VOC sensor 10, 10' may be connected to the processor 104 operatively associated with the printing system 100 via a wired or wireless connection, where measurements taken by the IR detector 14 are sent and processed to determine the concentration of any VOCs present.

Examples of such printers include digital printers, laser printers, electrophotographic printers, and/or the like. In the example shown in FIG. 3, the VOC sensor 10, 10' may be placed at any position inside the printer 102, desirably in a position where VOCs are likely to be present. For instance, the VOC sensor 10, 10' may be placed adjacent to an exhaust fan. Other areas in which the VOC sensor 10, 10' may be placed include adjacent to an area inside the printer 102 where the VOCs are likely to be produced, such as adjacent to the ITM and/or the photoconductor (as shown in FIG. 3). Yet other areas in which the VOC sensor 10, 10' may be placed include at an area inside the printer 102 where a concentration of the VOCs may be above 1000 ppm (e.g., adjacent to an entrance of a condenser (not shown in FIG. 3), such as inside a duct formed between the ITM and the condenser, where the VOCs are condensed into a liquid). In the latter instance, placing the VOC sensor 10, 10' at an area inside the printer 102 where the concentration of the VOCs is high may enable one to use the sensor 10, 10' for alerts or the like.

The VOC sensor 10, 10' may be used to measure the amount of IR light transmitted through the space 16 containing the VOCs, and the measured amount of IR light may be used to determine the amount of the IR light attenuated by the VOCs. It is believed that the attenuation of the IR light traveling through the space 16 may be used to determine the concentration (e.g., in ppm) of VOC molecules present in the space 16. Examples of determining the concentration of the VOCs are described in detail hereinbelow.

The attenuation of IR light intensity with the VOC absorption frequency range may be measured as a drop of the signal produced by the IR detector 14 (i.e., the detector signal in the absence of VOCs minus the detector signal when VOCs are present). In an example, the detector signal in the absence of VOCs may be represented by a sensor signal of clean air, and this signal may be previously stored as a control value that is usable by the processor 104, which includes a computer software program including program code encoded on a computer readable medium to make the attenuation or IR light intensity calculation above. In another example, the detector signal in the absence of VOCs may be determined before the sensor 10, 10' is placed inside the printing system 100, and this signal may be used as the control value for the calculation. In yet another example, the detector signal in the absence of VOCs may be determined dynamically, such as on command by the processor 104 in instances where no VOCs are present inside/outside the printing system 100. The inventors of the instant disclosure have found that the concentration of the VOCs may be determined from the drop in the detector signal. In other words, the drop in the detector signal may be translated into the VOC concentration.

In an example, the drop in the detector signal may be translated into the VOC concentration by establishing a calibration relation of the drop in the detector signal ($\Delta V_{detector\ signal}$ (volts) versus the VOC concentration (ppm)) according to examples procedures described below. These example procedures will be described below utilizing ISOPAR® L as the VOC whose concentration is to be determined.

Figure 7:
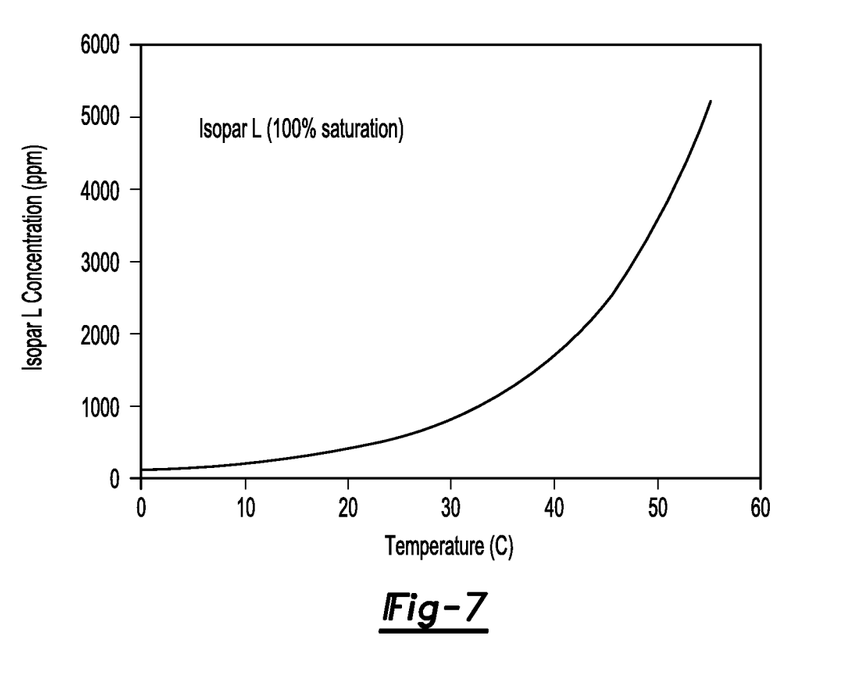
FIG. 7 is a graph showing saturated vapor density of ISO-PAR® L at various temperatures (° C.)
Figure 8:
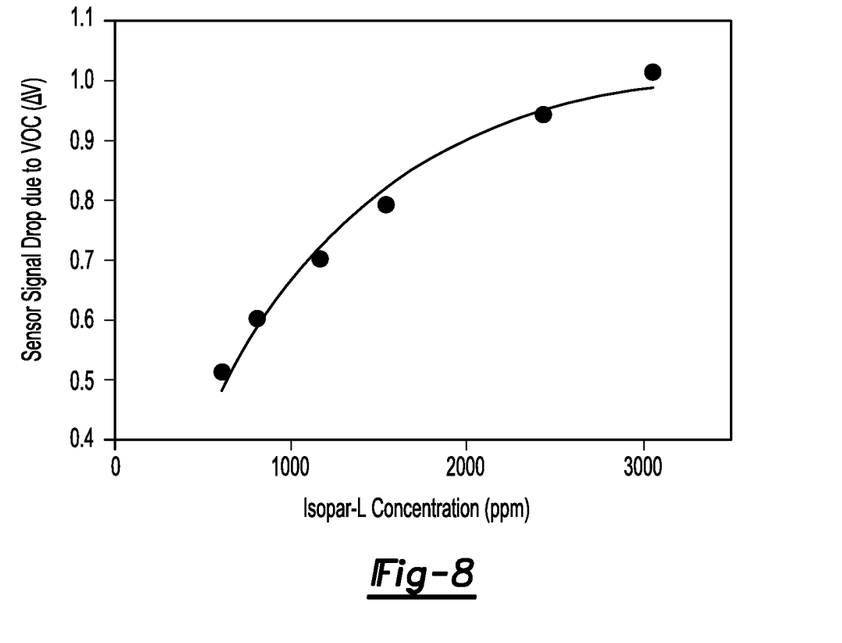
FIG. 8 is a graph showing an example of the correlation between the sensor signal drop due to the presence of ISO-PAR® L (V) and the concentration of the ISOPAR® L present (ppm).

In one example, the calibration relation procedure includes enclosing a copious amount of ISOPAR® L in an air-tight chamber having a volume small enough to facilitate saturation of ISOPAR® L vapor when the temperature is raised, as described below. For instance, the chamber may have a volume of about 2,000 cm$^3$ when the volume of ISOPAR® L used is about 100 cm$^3$ (which is about 76 grams of ISOPAR® L). The chamber is equipped with an IR sensor 12, a fan (e.g., for mixing the gases including the VOCs inside the chamber to ensure a substantially uniform distribution of the gases). The temperature of the chamber may be raised to a desired temperature T, which may be selected from room temperature (e.g., 20° C. to 30° C.) to about 80° C., to evaporate the ISOPAR® L until the concentration of the ISOPAR® L reaches a steady-state saturation value $N_{sat}$. This steady-state saturation, concentration value $N_{sat}$ may be defined by the $N_{sat}$ vs. T curve for ISOPAR® L (provided by Exxon-Mobil), as shown in FIG. 7. It was found that the detector 14 signal decreases while the ISOPAR® L evaporates until the signal reaches a steady state value ($V_{saturation}$), which corresponds to the saturated vapor density of the ISOPAR® L. In other words, a correlation between the drop of the detector signal (i.e., $\Delta V_{detector\ signal} = V_{with\ no\ VOCs} - V_{saturation}$) and the VOC vapor concentration may be established at a specific $N_{sat}$ point. Accordingly, the same correlation may be determined for different $N_{sat}$ by changing the temperature T until the entire curve of the $\Delta V_{detector\ signal}$ versus the concentration N is defined. An example of this curve is shown in FIG. 8, which will be described in detail below in conjunction with the Example.

In another example, a small amount of ISOPAR® L (such as, e.g., 1 g to about 5 g) in an open container may be weighed, and may be placed within the chamber previously described. The temperature of the chamber may be raised to about 80° C. for a predetermined amount of time (e.g., from about 10 minutes to about 30 minutes) while the detector 14 signal is monitored. After a period of time, the chamber is opened, and the ISOPAR® L container is covered (using a cover having a known weight) to prevent further evaporation of the ISOPAR® L, and the container is removed from the chamber and weighed. It is believed that the decrease in weight of the container is due, at least in part, to the evaporation of the ISOPAR® L. The evaporated amount (in terms of weight) of the ISOPAR® L may then be converted into a gaseous ISOPAR® L density, which is determined by dividing the weight difference by the volume of the chamber, and then converting the density into ppm units using, e.g., the ideal gas law. The concentration (ppm) is associated with the corresponding $\Delta V_{detector\ signal}$ (volts), and the procedure described above may be performed for several different amounts (in terms of weight) of the ISOPAR® L to form a calibration curve of $\Delta V_{detector\ signal}$ (volts) versus N (ppm). An example of this calibration curve is shown in FIG. 8.

It has been found that the calibration curve generated by the example procedures described above (as shown, e.g., in FIG. 8) may be used to convert $\Delta V_{detector\ signal}$ into N (i.e., concentration) under a unique set of sensor 10, 10' operating conditions. Further, the length L of the space 16 and the source 12 power require that an appropriate calibration curve be established for each set of operating conditions. For example, a high power IR source 12 and/or a long optical path length L may be used for low concentrations N, whereas a lower power IR source 12 and/or a smaller optical path length L may be used for high concentrations N. In one particular example, a concentration below 50 ppm may require a power source of about 100 mW and an optical path length L of less than about 20 cm, while a concentration above 1,000 ppm may require a power source below 1 mW and an optical path length L of less than about 10 cm.

The type and/or configuration of the IR detector 14 selected may depend, at least in part, on the VOC concentration range to be detected. For instance, if the VOC concentration range is 100 ppm to 10,000 ppm, and the optical path length is set to the same length as the absorption length for 10,000 ppm of VOCs, the IR source 12 and the IR detector 14 should be configured to providing a signal-to-noise ratio that is better than 100 in order to detect the lower concentration of 100 ppm. This may be accomplished using a 1 mW IR light source and an IR light detector having a 10 μW noise equivalent of power.

In instances where a compact sensor is necessary (such as, e.g., when the space inside the printer within which the sensor 10, 10' is to be positioned is constrained or otherwise too small to receive the sensor 10, 10' in its non-compact form), the optical path length may still be achieved using a multi-path geometry or cavity. For instance, an optical path length of 10 cm may be achieved using a 1 cm optical path length including a 10-pass detection geometry (e.g., using mirrors bouncing the IR light 10 times to reach a 10 cm optical path length).

It is further to be understood that, in some instances, the VOCs present inside the system may be present in the vapor phase, as well as in the liquid phase (e.g., as a mist). For instance, the mist may form droplets of VOCs inside the printing system 100, e.g., on the condenser but where not exposed to the fan(s). The generation of mist may also be evidence when the printing coverage (i.e., the percent of the page area covered with an ink) is high (e.g., 80% to 100% printing coverage so that the total vapor density generated is higher than the saturated vapor density at the same temperature. In some instances, the VOC mist present inside the space 16 of the VOC sensor 10, 10' may reduce the measured IR transmittance signal due, at least in part, to light scattering as opposed to absorption, and may result in false VOC concentration estimations. One way to eliminate this issue includes measuring the light transmittance outside of the VOC absorption band, where only scattering occurs, and then subtracting the amount of scattered light from the amount of light input by the IR light source 12 to obtain a more accurate calculated absorption value. This process may be accomplished by utilizing two sensors 10, 10' in tandem, where one of the sensors 10, 10' includes a band-pass filter within the absorption band to measure both of the absorption and scattering, and the other sensor 10, 10' includes a band-pass filter placed outside of the absorption band to measure scattering alone.

To further illustrate the present disclosure, an example is given herein. It is to be understood that this example is provided for illustrative purposes and is not to be construed as limiting the scope of the disclosure.

EXAMPLE

Figure 5A:
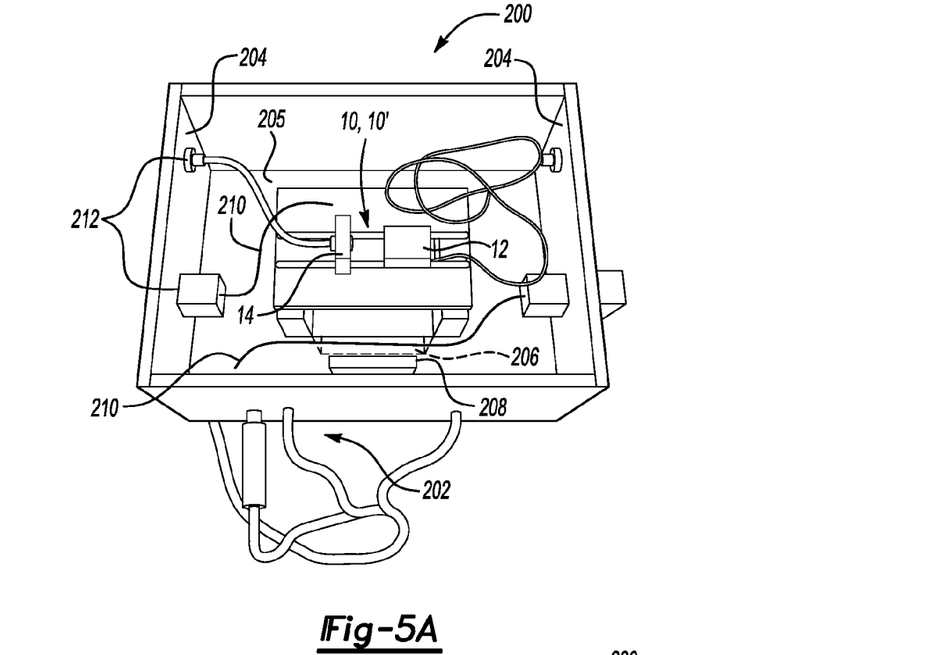
FIGS. 5A and 5B are drawings showing a calibration setup of an example of a VOC sensor.
Figure 5B:
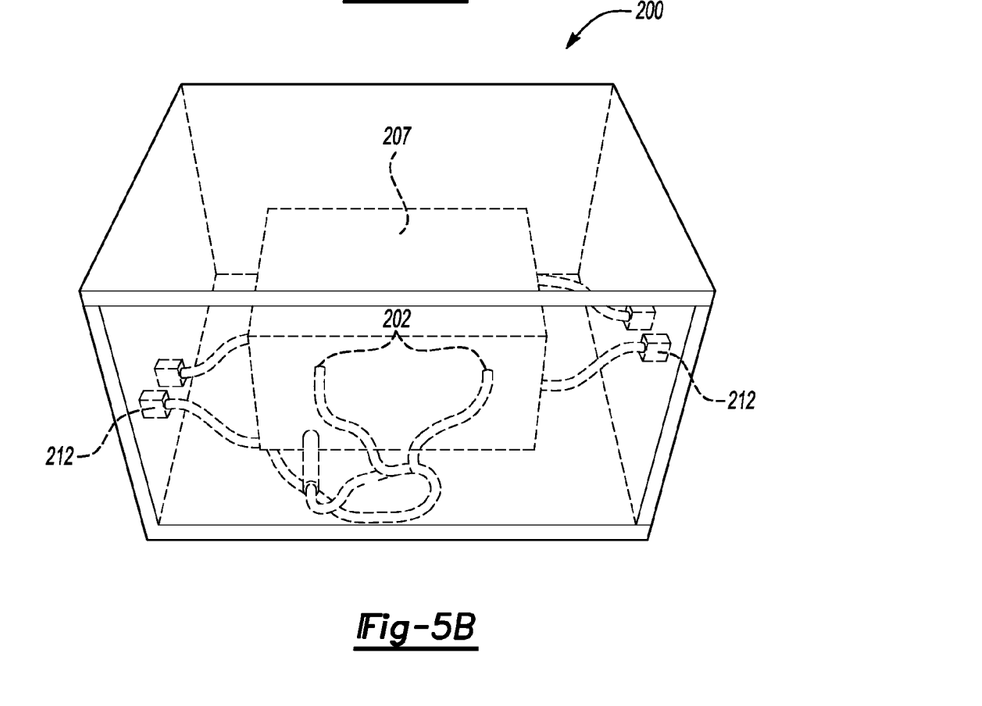

A VOC sensor was assembled and calibrated in an environmental setup, as semi-schematically shown in FIGS. 5A and 5B. This environmental setup consisted of an air-tight inner metal chamber 200 with walls 204, a floor 205 and a removable top 207 (see FIG. 5B). Heater wires 202 are connected to electric heaters (not shown) disposed inside the walls 204 to provide uniform heating of the entire volume of the chamber 200 and to provide the same temperature of the walls 204 as within the chamber 200. The chamber 200 also includes, built into the bottom thereof, a reservoir 206 to hold a supply of ISOPAR® L. The chamber 200 was also equipped with a low speed fan 208 to provide a uniform distribution of gases making up the atmosphere within the chamber 200, a holder to maintain the sensor 10, 10' above the ISOPAR® L reservoir 206, thermocouples 210 to measure temperature (K) at different locations within the chamber 200, and multiple electrical and thermocouple feedthroughs 212 used to provide power at least to the IR light source 12 and IR detector 14, and to transfer the sensor signal and the signals produced by the thermocouple(s) outside of the chamber 200. The chamber 200 was enclosed in an air-tight plastic enclosure to provide additional insulation of the chamber from outside ambient air (as shown in FIG. 5B), and to maintain a steady temperature within the chamber 200. The temperature within the chamber 200 was also stabilized and controlled using an OMEGA® temperature controller (Omega Engineering, Inc., Stamford, Conn.) (not shown) using a signal from one of the inner thermocouples 210.

It was found that the environmental setup shown in FIGS. 5A and 5B may be used to stabilize and maintain a constant temperature below 100° C. (which was the highest temperature tested) within the chamber 200 with accuracy within about 0.1° C. It was also found that the temperature at different locations within the chamber 200 differed by less than 0.1° C. (which was measured using multiple thermocouples placed at different locations within the chamber). Further, an increase of the temperature controller setpoint caused an immediate increase of the temperature within the chamber 200 until the temperature was stabilized, which occurred after about 5 min to about 30 minutes depending, at least in part, on the difference between the initial temperature and the final temperature of the chamber.

A series of measurements were taken to evaluate the sensor signal originating from the chamber 200. These measurements were taken when the temperature of the chamber 200 was above room temperature (i.e., above 21° C.), where at this temperature range, the chamber 200 becomes a blackbody radiation source (i.e., a "hot" chamber). The measurements were done using a dry chamber; i.e., the chamber did not contain any ISOPAR® L vapor or other species capable of IR light absorption within the sensor operating frequency range. The measurements were taken over an extended range of temperatures and incorporated into further analysis. Due, at least in part, to the relatively low temperature of the chamber compared to the IR light source temperature, noise from the chamber radiation is less than about 2% of the sensor signal.

Figure 6:
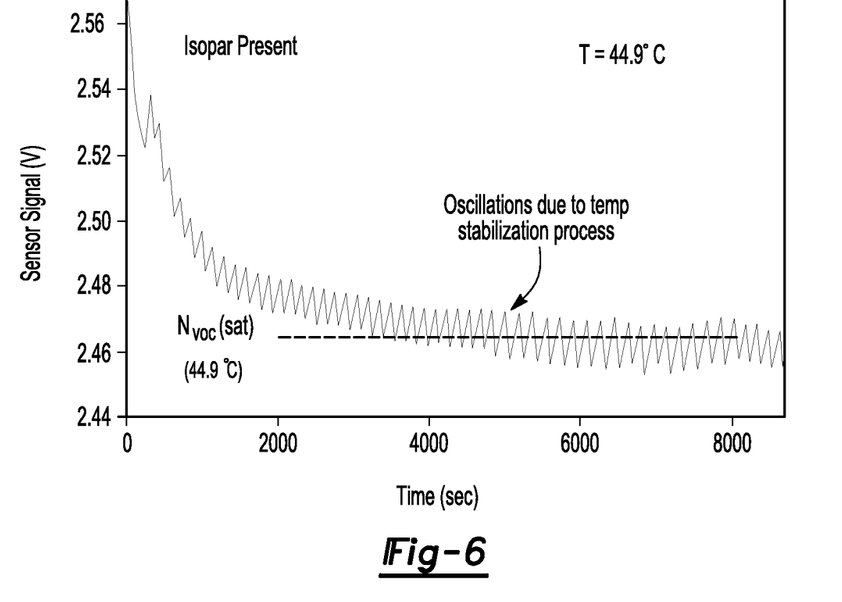
FIG. 6 is a graph showing an example of a temporal response of a detector signal, which corresponds to the speed at which the vapor density of ISOPAR® L inside an enclosed space reaches its saturated value.

Subsequently, the reservoir was filled with ISOPAR® L, and then the chamber was closed. The chamber temperature was set to a temperature value between room temperature (i.e., 21° C.) and 50° C., and the sensor signal was monitored while the temperature inside the chamber was stabilized. An example of the sensor signal behavior is shown in FIG. 6. More specifically, FIG. 6 shows that raising the temperature causes evaporation of ISOPAR® L, as well as a corresponding drop of the sensor voltage signal. This process was continued until the ISOPAR® L vapor density reached its saturation point (e.g., 44.9° C.) at a particular set temperature, and the sensor signal reached a steady state point (shown by the signal plateau in FIG. 6). This steady state point of the sensor signal means that the same amount of the liquid ISOPAR® L was evaporated as the amount of vaporous ISOPAR® L was turned into a liquid. The plateau signal corresponds to a saturated vapor density of the ISOPAR® L at a given temperature. It is to be understood that stabilizing the temperature within the chamber may take a relatively short amount of time (e.g., up to about 30 min), whereas reaching the vapor saturation point may take a longer amount of time (e.g., up to 4 hours). This observation was incorporated into the sensor measurements, and the typical lag time between changing the temperature controller setpoint and reading the sensor signal corresponding to saturated vapor density lasted for several hours, as also shown FIG. 6.

As previously mentioned, the correlation between the saturated ISOPAR® L vapor density and the temperature may be found using the calibration curve shown in FIG. 7. The procedure described above was repeated for different temperature setpoints, and a calibration curve was made between the ISOPAR® L vapor density and sensor signal, as shown in FIG. 8. This calibration curve may then be used to translate the sensor voltage signal into a VOC density expressed in ppm.

Further, the calibration curve shown in FIG. 8 was obtained for a specific set of sensor parameters, such as the type of IR light source, the type of IR detector, the IR source power, and the distance between the IR source and detector. In the example shown in FIG. 8, the source/detector distance (or length L shown in FIG. 1) was about 3 cm. The same calibration process was repeated by changing the parameters identified above to create a set of the calibration curves, where each was defined by its respective parameters.

It is to be understood that the ranges provided herein include the stated range and any value or sub-range within the stated range. For example, an optical path length ranging from about 0.5 cm to about 20 cm should be interpreted to include not only the explicitly recited amount limits of about 0.5 cm to about 20 cm, but also to include individual amounts, such as 1 cm, 3.5 cm, 5 cm, 15 cm, etc., and subranges, such as 1 cm to 10 cm, etc. Furthermore, when "about" is utilized to describe a value corresponding to the length L of the space 16, this is meant to encompass minor variations up to 0.5 mm of the stated value. However, when "about" is utilized to describe any other value disclosed herein, this is meant to encompass minor variations (up to +/−5%) from the stated value.

It is further to be understood that, as used herein, the singular forms of the articles "a," "an," and "the" include plural references unless the content clearly indicates otherwise.

While several examples have been described in detail, it will be apparent to those skilled in the art that the disclosed examples may be modified. Therefore, the foregoing description is to be considered non-limiting.

What is claimed is:

1. A volatile organic compound sensor, comprising:
   a source of infrared (IR) light;
   a detector for detecting the IR light; and
   a space defined between the IR light source and the IR light detector, the space to include i) volatile organic compounds (VOCs) based on aliphatic hydrocarbons, aromatic hydrocarbons, or combinations thereof, and ii) infrared light transmitted through the space at a frequency corresponding to an infrared light absorption band representative of particular VOCs;
   wherein the detector measures an amount of IR light transmitted through the space, the measured IR light transmitted being attenuated by VOC light absorption when in the space, and wherein an amount of IR light attenuation is related to a concentration of the VOCs present in the space.

2. The sensor as defined in claim 1 wherein the source of the infrared light is chosen from a broadband blackbody infrared light source, a monochromatic infrared light source, or a narrow band infrared light source.

3. The sensor as defined in claim 2 wherein the source of infrared light is chosen from the narrow band infrared light source, and wherein the narrow band infrared light source emits the infrared light at the frequency corresponding to the infrared light absorption band representative of particular volatile organic compounds.

4. The sensor as defined in claim 2 wherein the IR light source is a broadband blackbody IR light source, and wherein the sensor further comprises a narrow band transmittance filter positioned i) adjacent to or on the broadband blackbody IR light source or ii) adjacent to or on the IR detector, the filter enabling a portion of a broadband blackbody IR light source emission that corresponds to an absorption band representing the VOCs alone to be transmitted to the IR detector.

5. The sensor as defined in claim 1 wherein the infrared light detector is chosen from a thermopile detector, a pyroelectric detector, and a photoconductive detector.

6. The sensor as defined in claim 1 wherein the volatile organic compound sensor is incorporated into a printing system, and wherein the space defined between the infrared light source and the infrared light detector has an optical path length ranging from about 1 cm to about 20 cm.

7. The sensor as defined in claim 6 wherein the space ranges from about 2 cm to about 10 cm, and wherein the infrared light detector is chosen from one that provides a signal-to-noise ratio that is greater than about 1000.

8. The sensor as defined in claim 1 wherein the space defined between the IR light source and the IR detector is enclosed, and wherein the space includes an in-flow connector and an out-flow connector to enable a substantially constant, free flow of the VOCs.

9. A printing system, comprising:
   a printer to print inks including solvents having a volatile organic compound (VOC) therein; and
   a VOC sensor operatively disposed inside or adjacent to the printer, the sensor including:
   a source of infrared (IR) light;
   a detector for detecting the IR light; and
   a space defined between the IR light source and the IR light detector, the space to include volatile organic compounds (VOCs) during printing;
   wherein the detector measures an amount of IR light transmitted through the space, the measured IR light transmitted being attenuated by VOC light absorption when in the space, and wherein an amount of IR light attenuation is related to a concentration of the VOCs present in the space.

10. The printing system as defined in claim 9 wherein the sensor is disposed inside the printer at one of i) adjacent an intermediate transfer medium (ITM) exhaust stream, ii) adjacent to an area inside the printer where the VOCs escape from the printer, iii) at an area inside the printer where a concentration of the VOCs is above 1000 ppm, or iv) at a position outside of the printing system where VOCs originating from the printing system may be present.

11. A method for determining a concentration of volatile organic compounds emitted from a printing system, the method comprising:

incorporating a sensor into the printing system, the sensor including an IR light detector to measure an amount of IR light transmitted through a predefined space for containing the volatile organic compounds emitted from the printing system, the measured IR light transmitted being attenuated by VOC light absorption when in the space, and wherein an amount of IR light attenuation is related to a concentration of the VOCs present in the space; and incorporating a processor into the printing system, the processor executing computer program code encoded on a computer readable medium to determine the concentration of the volatile organic compounds contained in the space.

12. The method as defined in claim 11 wherein the sensor includes an infrared light source, and wherein the predefined space is between the source and the detector, the space defining an optical path length for the detecting, and wherein the detecting is accomplished at an optical path length ranging from about 0.5 cm to about 20 cm.

13. The method as defined in claim 11 wherein the amount of IR light attenuation is measured within the VOC absorption frequency range, and wherein the measurement is accomplished by determining a difference in a signal produced by the IR light detector in the absence of VOCs and an other detector signal when VOCs are present.

14. The method as defined in claim 13, further comprising translating the difference in the signal produced by the detector into the concentration of the VOCs present in the space.

15. The method as defined in claim 11 wherein the concentration of the volatile organic compounds contained in the space ranges from about 0.5 ppm to about 10,000 ppm.

* * * * *